C. G. WELD.
FLUID PRESSURE DRIVEN PUMP.
APPLICATION FILED APR. 25, 1911.
1,114,659.
Patented Oct. 20, 1914.
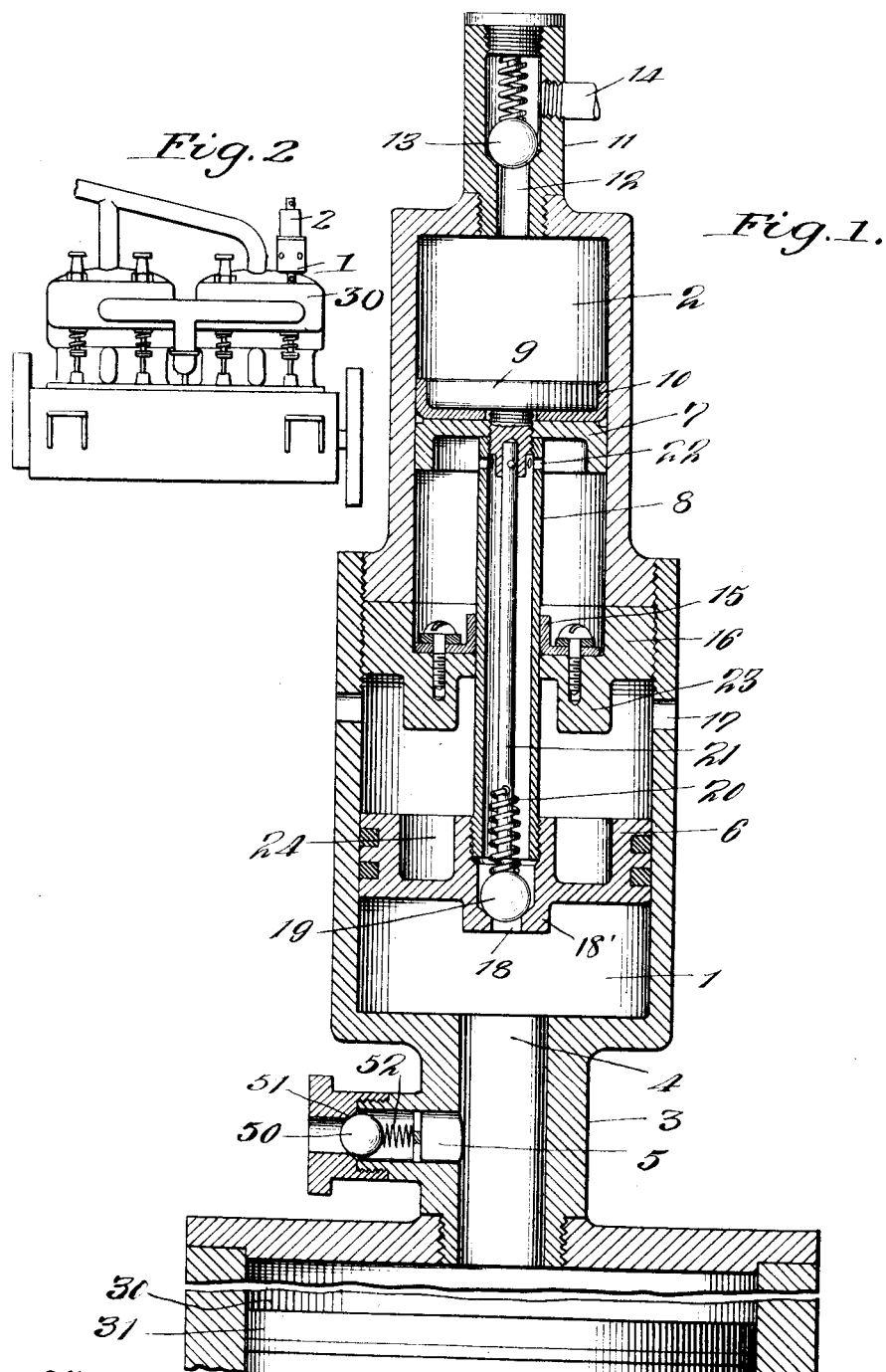

UNITED STATES PATENT OFFICE.

CARLEY GOULD WELD, OF NORTH CHATHAM, MASSACHUSETTS.

FLUID-PRESSURE-DRIVEN PUMP.

1,114,659.  Specification of Letters Patent.  Patented Oct. 20, 1914.

Application filed April 25, 1911. Serial No. 623,181.

*To all whom it may concern:*

Be it known that I, CARLEY GOULD WELD, a citizen of the United States, residing in North Chatham, in the county of Barnstable and Commonwealth of Massachusetts, have invented certain new and useful Improvements in Fluid-Pressure-Driven Pumps, of which the following is a full, clear, and exact specification.

My invention relates to pumps of the character which are designed for attachment to one cylinder of a multicylinder internal combustion engine, and actuated by the compression thereof for the purpose of creating compressed fluid. The pump of the present invention is designed more particularly for use on automobile engines as a means for tire inflation. Pumps of this general type, as heretofore known have been constructed as single acting or one-stage compression pumps. Such pumps have been provided with a single compression cylinder, charged with fluid at atmospheric pressure upon the suction or inactive stroke of the pump piston, said fluid being compressed and forced to the tire by the active or compressing excursion of the piston. These single stage or simple pumps are more or less efficacious when used for inflating automobile tires of the smaller sizes, which require but a relatively small volume of fluid under a low pressure, but they are slow in operation and are not well suited to supplying the large volumes of air at high pressures required for the inflation of tires of large size.

My invention has for its object the production of an improved pump which without increase in size or undue complication of parts will operate with greater efficiency than the simple or one stage pumps previously employed and which will compress larger volumes of air to adequate pressures with greater rapidity, so that it can be employed for the satisfactory inflation of pneumatic tires of any size to any required or desired pressure. To the accomplishment of this object, I have produced a pump having a compression cylinder or chamber, which is supplied with a pre-compressed charge of fluid preferably by the actuation of the engine piston operating in the cylinder to which the pump is attached, this pre-compressed charge being subsequently acted upon by the pump piston and further compressed and forced thereby to the tire desired to be inflated. In the preferred embodiment of my invention I initially compress the fluid by the direct action of the engine piston, utilizing the engine compression to supply the charge to the compression cylinder of the pump as well as utilizing it for actuating the pump piston to raise the pre-compressed charge to a high pressure and deliver it to the tire. By this arrangement a compound or multiple stage compression is accomplished which makes possible the delivery to the tire of a much greater volume of air without enlargement of the pump chambers, than is obtainable with a single stage pump. At the same time this highly advantageous result is achieved without complication of parts and with apparatus which may be connected to and operated from but a single cylinder of the engine. I do not wish to be limited to the illustrated and described embodiment of my invention, however, which is set forth by way of example only, as the desired compound action may be secured in other ways.

In the accompanying drawings, Figure 1 is a vertical cross-sectional view of an apparatus illustrating one preferable embodiment of my invention, the pump being shown associated with a fragmentary detail of one cylinder of an internal combustion engine with its reciprocating piston. Fig. 2 is a diagrammatic view showing the whole engine with the pump applied to one cylinder thereof.

The pump as shown is of the differential type, and is provided with a screw-threaded end 3, which is adapted for screw-threaded connection with the spark plug opening or other suitable opening of the cylinder 30 of the engine by which the pump is to be operated. The differential pump cylinders are indicated by the numerals 1 and 2; 1 being what may be termed the power cylinder or chamber and 2 being the compression cylinder. These may for convenience of manufacture be connected together through the medium of screw threads as shown or the parts may be formed in any other suitable manner. Positioned within the respective cylinders are the differential pistons 6 and 7, which are operatively connected together, preferably by means of a hollow piston rod 8, so that they will operate in unison. The chamber of the lower cylinder 1 is separated from the chamber of the upper cylinder 2 by suitable means such as the separator member 16 and packing 15 which surrounds the piston rod 8. The hollow piston rod 8 affords a communicating passage from the power side of the piston 6 to the lower side of the piston 7. This passage is controlled by a check valve 19, which is held to its seat by gravity and by the pressure of the spring 20, which is supported and held in alinement by the rod 21. Ports 22 are provided which lead from the passage 18 to the lower side of the piston 7. The piston 7 in effect divides the compression cylinder 2 into two chambers, that above the piston being the compression chamber from which the air is forced to the tire, while that below the piston may be termed the "pressure storage chamber", which receives the pre-compressed air from the engine cylinder or other source, or which in some cases may be the chamber in which the pre-compression takes place, and which holds such pre-compressed air until it is passed into the compression chamber. In some embodiments of the invention, such for example as that illustrated, this pressure storage chamber is also a power chamber as the pressure in it assists in moving the differential piston member of the pump. When pumps of this general type are used in connection with automobile engines, it is preferable to operate the engine under a low or moderate speed in order that the floating differential pump piston may keep step with the effective power strokes of the engine piston. In other words, the engine piston may be operated so fast as to catch the pump piston "asleep" and it will then fail to operate. In throttling the engine down, the compression of the engine is materially reduced owing to its inability to obtain through suction the required amount of gas to initially obtain an atmospheric pressure preparatory to the piston's compression stroke. In order to compensate for this, I provide an air inlet, or what I may term a "breather valve." This valve is conveniently located near the connecting end 3 of the pump, and may comprise a ball 50 held to its seat 51 by a light spring 52. This ball or check controls the passage 5 which communicates with the engine cylinder by way of the passage 4. It will be observed that the check valve 50 opens inwardly, and this upon the suction stroke of the engine piston, so that upon this stroke fresh air will be admitted to the compression chamber of the engine, establishing an atmospheric pressure condition therein, thus producing a larger volume of air to be acted upon by the engine piston 31 and consequently a higher degree of operating fluid pressure to actuate the pump and supply the pre-compressed charge to the compression chamber of the pump than would be possible if the breather valve were not used. The use of a breather valve or other means for supplying atmospheric air to the engine cylinder is also of particular importance in a pump such as that illustrated in which a part of the air compressed in the engine cylinder is recompressed and forced into the tire, as by this means the supplying of fresh pure air to the tire is assured. If the only air supply for the engine cylinder were through the carbureter, it will be seen that a mixture of air and gasolene vapor would be forced into the tire, which might be very injurious to the rubber in the latter. It will be understood that any means for supplying fresh air to the engine cylinder may be employed, although the inlet for this purpose is preferably formed in the pump instead of in some part of the engine. In this way the mere detachment of the pump and the insertion of the spark plug in its socket in the engine cylinder serves to place the cylinder in condition for the normal operation of the engine. No special construction or modification of any part of the engine or its fuel connections is required as the pump itself contains all the necessary elements to insure its satisfactory operation when screwed into place on the engine cylinder.

Controlling the outlet of the pump, I provide a ball valve 13 which is held to its seat by a light compression spring 13'. This check valve acts to prevent the air from returning from the outlet 14 after it is once compressed and forced therethrough. In order to cushion the ends of the strokes of the differential piston, I preferably provide suitable dash-pot means comprising the annular extension 23 and the complemental annular socket 24. It will be apparent that as these parts are brought together, air will be trapped within the socket 24 forming a cushion on the upward excursion of the differential piston. To cushion the down stroke an extension 18' is provided which fits within the bore or passage 4. It will be apparent that as the extension enters the passage, the air will be similarly trapped between the power side of the piston 6 and the bottom wall of the cylinder 1, thus cushioning the downward excursion of the piston. In order to prevent or relieve any tendency toward vacuum within the chamber of the cylinder 1, above the power piston, ports 17 are provided in the side wall to permit the free ingress and egress of the air.

The operation is as follows: It will be understood that in a four-cycle engine, owing to the inlet and exhaust valve operation, there will be but two active or power strokes of the engine piston on each cycle which can be availed of in a pump of this type. Assuming that the exhaust valve is closed and the inlet valve is open, the carbureter being throttled as is usual, the engine piston 31 on its downward stroke creates a suction which will cause the inlet or breather valve 50 to become unseated and fresh air from the atmosphere to be sucked in through the passages 5 and 4 to the compression space above the engine piston 31. The engine piston 31, upon its succeeding compressing excursion, compresses the air within the engine cylinder and forces it into the pump, a part passing up through the passage 18 of the hollow piston rod 8. through ports 22 into the pressure storage chamber formed between the power side of the piston 7 and the stuffing box or partition 16, another portion entering beneath the power side of the piston 6. This fluid pressure exerting itself upon the under or power sides of the pistons 6 and 7, actuates the differential piston upon its compressing or active stroke, compressing the pre-compressed fluid in the compression chamber of the cylinder 2 and forcing it through the outlet to the tire. At this stage of the operation, it will be observed that a pre-compressed charge of air is lodged within the pressure storage chamber or space formed between the partition or stuffing box 16 and the under or power side of the piston 7, the valve 19 having reseated itself as soon as the charge is fully lodged within the storage chamber. This fluid under pressure is automatically transferred to the compression space above the piston 7 as the piston descends preparatory to its next compression stroke, the fluid under pressure passing around the peripheral edge of the guide and cup-shaped washer which forms the piston 7. It will be understood that upon the succeeding stroke the cup-shaped washer is caused to expand outwardly against the wall of the cylinder, acting as a valve in the well known manner. When the engine piston descends again on its next active suction stroke the pressure is immediately relieved from the under side of the power piston and what remaining pressure there is in chamber 2 above the piston 7 tends to force the differential piston downwardly. A repetition of the compression stroke of the engine piston will cause the differential piston to move upwardly and compress the pre-compressed contents of the compression space above the piston 7 to a higher pressure and force it to the tire.

In some of the claims the compression chamber is referred to as having a "movable wall," this expression being intended to designate broadly that part of the compression chamber which is movable so as to alter the volume of the chamber. In the example of my invention shown, the movable wall is formed by the piston 7. The expressions "check valve" or "check valve means" used in the claims are intended to refer to any structure or arrangement permitting the passage of fluids in one direction but preventing or substantially preventing passage in the other direction.

While I have shown and described but one specific embodiment of my invention, I do not wish to be understood as limiting myself thereto but intend to cover the principle of my invention broadly and in the many embodiments of which that principle is susceptible.

Having thus described my invention I claim:

1. A pump, comprising the combination with a power chamber, a compression chamber of less diameter, power and compression pistons in the respective chambers, connected with each other, a passage leading from the power chamber to the compression chamber below the piston therein, and a check valve in said passage, seating against pressure from the power chamber, said smaller chamber piston being adapted to permit air to pass from below the piston to the space above it during its down stroke.

2. A pump, comprising a pair of cylinders of different diameters connected end-to end, pistons in said cylinders, a partition wall between the pistons, a tubular piston rod extending through the partition wall and connected with the pistons, said wall having packing bearing upon said rod, and said rod affording communication between the spaces below the respective pistons, a valve arranged to permit delivery from below the larger piston to the space below the smaller piston, said smaller cylinder being provided with a valved outlet at its upper end, and said larger cylinder having a tubular inlet at its lower end adapted to be connected with a source of pressure supply, and means for permitting fluid to pass the smaller piston during its movement in the direction of the larger cylinder.

3. In combination with a prime mover provided with a compression chamber, of an air pump, communicating with and connected thereto, said pump having two connected cylinders, a differential piston in said cylinders, a valve-controlled communicating passage-way between said cylinders; said piston being operated by the pressure and suction created within the prime mover and means for preventing any vacuum that may be caused by suction during the suction operation of the prime mover, by admitting air to the same to secure an atmospheric pressure therein preparatory to its compression operation.

4. In combination with a prime mover provided with a compression chamber and a piston therein, of a detachable air pump having a plurality of connected cylinders of relatively different diameters, a floating differential piston in said pump, said piston comprising a connecting rod provided with a valved passage-way therethrough, piston heads in each cylinder at the ends of the connecting rod; said floating piston being operated by the pressure and suction created during the operation of the prime mover, and means for admitting air to the compression chamber of the prime mover upon the suction stroke of the piston to secure an atmospheric pressure therein preparatory to each working impulse of the pistons.

5. In combination with a prime mover provided with a compression chamber and a piston therein, of a detachable air pump having a plurality of compression cylinders of different diameters, a floating differential piston mounted therein, comprising a plurality of piston heads mounted to work in unison, a valved communicating passage-way leading from one cylinder to the other; said floating piston being operated by the pressure and suction created by the operation of the piston of the prime mover and means comprising a valved passage-way for admitting to the compression chamber of the prime mover air to prevent a vacuum and secure therein atmospheric pressure preparatory to the compression stroke of the piston in the chamber of the prime mover.

6. A detachable air pump adapted to co-operate with one cylinder of a multicylinder engine, said pump being formed with a pair of differential cylinders, a differential floating piston adapted to be reciprocated in said cylinders, and an automatic valve controlled means in one cylinder for admitting atmospheric air thereto and valve controlled means for admitting said air to the other of said cylinders.

7. In combination with a prime mover provided with a compression chamber, of a detachable pump having a plurality of chambers of relatively different diameters, a floating differential piston mounted in said pump, a valve-controlled communicating passage-way leading from one chamber of the pump to the other, said floating piston being operated by the pressure and suction created by the operation of the prime mover and means for admitting to said pump and prime mover air to secure therein atmospheric pressure preparatory to each working impulse of the floating piston.

8. The combination with one cylinder of an internal combustion engine of a pump comprising power and compression chambers, a piston in the power chamber, a movable wall for the compression chamber fixed relatively to said piston, a passage arranged to afford communication between said power chamber and the engine cylinder whereby fluid under pressure from said engine cylinder may actuate said piston, and a second passage whereby fluid under pressure from the same engine cylinder may be passed to said compression chamber to be further compressed when said piston and movable wall are actuated.

9. The combination with one cylinder of an internal combustion engine of a pump having means to receive compressed fluid from said cylinder, and means operated by fluid compressed in said engine cylinder for compressing to a higher pressure fluid previously received in said pump from said engine cylinder.

10. The combination with one cylinder of an internal combustion engine, of a pump connected therewith and provided with a compressing chamber, means for supplying fluid compressed in said engine cylinder to said compressing chamber, and means actuated by the compression in the same engine cylinder arranged when operated to compress said fluid to a higher pressure.

11. The combination with one cylinder of a multiple cylinder internal combustion engine, of a compression chamber, means for utilizing the energy of the engine piston for supplying air to said chamber at a pressure greater than atmospheric, and means for utilizing the energy of the same engine piston for further compressing the air in the said chamber.

12. The combination with one cylinder of a multiple cylinder internal combustion engine, of a pump connected to said cylinder and comprising a power cylinder having a piston movable therein and a compression chamber having a movable wall operatively connected to said piston, means utilizing the compression in the engine cylinder to fill the compression chamber of the pump with air at a pressure greater than atmospheric, and means for introducing compressed air from the engine into the power cylinder of the pump to operate the piston thereof and further compress the air in the compression chamber of the pump.

13. The combination with one cylinder of a multiple cylinder internal combustion engine, of a pump connected with and operated from said cylinder, said pump having a power chamber and a compression chamber, means for introducing fluid under pressure into said compression chamber, means for introducing fluid under pressure from said engine cylinder into said power chamber, and a movable member actuated by the fluid under pressure in said power chamber to further compress said fluid in said compression chamber.

14. The combination with one cylinder of a multiple cylinder internal combustion engine, of a pump comprising a power cylinder and piston and a compression cylinder and piston of less diameter than the power cylinder and piston respectively, means for utilizing the energy of the engine piston for compressing air outside of said compression cylinder, means for supplying said compressed air to said compression cylinder, and means for utilizing the air compressed in said engine cylinder for operating said power piston, said power piston actuating said compressing piston to further compress the air in said compressing cylinder.

15. Apparatus for compressing air comprising a casing, power and compression pistons within the casing, a passage whereby fluid under pressure may pass to the power applying side of the power piston to operate said power piston, a valved passage whereby a portion of said fluid is permitted to be passed to a point on the low compression side of the compression piston during one stroke of the power piston, and means for permitting fluid to pass from the low compression side of the compression piston to the high compression side thereof, during the next stroke of the power piston in the opposite direction.

16. The combination with one cylinder of an internal combustion engine of an air compression pump having a power cylinder and a compression cylinder, said compression cylinder being of less diameter than said power cylinder, pistons working in said cylinders, a hollow rod connecting said pistons and forming a passage between the power applying side of the piston in the power cylinder and the compression cylinder of the pump, a check valve in said passageway permitting the passage of air into the compression cylinder, a passage arranged to connect the power cylinder of the pump with the engine cylinder, and a check valve controlled passage for supplying atmospheric air to the power cylinder of the pump and to the engine cylinder.

17. In an impulse pump, the combination of a power chamber, a pressure storage chamber and a compression chamber, connected pistons adapted to reciprocate relatively to said chambers, means for supplying compressed fluid simultaneously to the power chamber and to the pressure storage chamber during a stroke in one direction, and means for transferring the compressed fluid from the pressure storage chamber to the compressing chamber during the succeeding stroke in the reverse direction.

18. In a fluid compression pump, the combination of a power chamber, a passage arranged to admit pressure to the power chamber, a pressure storage chamber, a communication between said chambers controlled by a one-way valve, a compression chamber, a movable wall separating said compression chamber from said pressure storage chamber, and means for permitting fluid to pass from the pressure storage chamber to the compression chamber during one stroke of the said movable wall, said movable wall being operated by alternate compression and suction in the power chamber.

19. The combination with one cylinder of a multiple cylinder internal combustion engine, of a pump having two cylinders of different diameters, the larger of said cylinders constituting a power cylinder and connecting with the interior of said engine cylinder, a piston working in said power cylinder and adapted to be reciprocated by alternate pressure and suction in said engine cylinder, the smaller of said cylinders having a piston therein dividing said cylinder into a compression chamber and a pressure storage chamber, means affording a passage for air from said pressure storage chamber to said compression chamber, and a check valve controlled passage for admitting air into said pressure storage chamber.

20. The combination with a prime mover provided with a compression chamber and a piston therein, of a detachable air pump provided with means for admitting air to the compression chamber of the prime mover to secure an atmospheric pressure therein preparatory to each working impulse of the piston, a piston within said pump actuated by fluid compressed by the piston of said prime mover, means for introducing fluid so compressed into a compression chamber of the pump, and means actuated by the pump piston for further compressing said fluid when said pump piston is acted upon by said fluid from the cylinder of the prime mover.

21. An impulse compression pump comprising a power cylinder having a tubular stem at one end thereof, a check valve controlled passage opening into said stem, a second cylinder of less diameter than said power cylinder, connected pistons working in said cylinders, a check valve controlled passage leading from said power cylinder below the piston therein to said compression cylinder, and a discharge port in said compression cylinder above the piston therein.

22. In a fluid compression pump adapted to be operated from one cylinder of an internal combustion engine, the combination of a power chamber, a pressure storage chamber and a compression chamber, a movable member having a part working in said power chamber and having a part forming a movable wall for said compression chamber, means for introducing air under pressure into said storage chamber during the movement of said movable member in one direction and means for passing said air under pressure to said compression chamber during the movement of said member in the opposite direction.

23. The combination with one cylinder of an internal combustion engine of a pump, comprising power and compression cylinders, power and compression pistons in the respective cylinders, said power cylinder being provided with an inlet whereby that portion of the power cylinder on one side of the piston therein may have communication with the cylinder of the internal combustion engine, said power piston being operated by alternate compression and suction created within the engine cylinder, and a valved passage whereby fluid may pass from the power cylinder on the power-applying side of the piston therein to the high-compression side of the piston in the compression cylinder.

24. The combination with one cylinder of a multiple cylinder internal combustion engine of a pump connected therewith comprising a power cylinder, a piston working therein and a compression chamber including a movable wall operatively connected to said piston, said pump including a check valve controlled passage for admitting atmospheric air into said engine cylinder, said air being compressed in said engine cylinder and serving to operate the power piston in said pump, and a valve controlled passage for conducting a part of said air to the compression chamber of said pump, whereby when said pump is operated by alternate compression and suction in said engine cylinder, a part of the fresh air drawn into the said engine cylinder will be compressed and forced into the compression chamber of said pump and further compressed by the action of the remainder of said air upon the power piston of said pump.

25. The combination with one cylinder of an internal combustion engine of apparatus for compressing air, comprising a casing, a compression chamber within said casing, a movable element in said compression chamber, a passage arranged to permit compressed fluid to pass from the engine cylinder to said casing to actuate said movable element, and a valved passage arranged to permit a portion of said fluid to pass to the compression chamber to be further compressed by said movable element.

26. Apparatus for compressing air comprising a casing containing a compression chamber and two power chambers, a movable element in said casing adapted when operated to compress fluid in said compression chamber, means for admitting fluid to said power chambers to move said element on its compression stroke, and means for permitting fluid to pass from one of said power chambers to the compression chamber during the idle stroke of said element.

In witness whereof I have hereunto set my hand in the presence of two subscribing witnesses.

C. GOULD WELD.

Witnesses:
WASHINGTON R. TAYLOR
ERASTUS T. BEARSE.